US008844280B2

(12) United States Patent
Peterson et al.

(10) Patent No.: US 8,844,280 B2
(45) Date of Patent: Sep. 30, 2014

(54) HYDRAULIC CONTROL SYSTEM HAVING CYLINDER FLOW CORRECTION

(75) Inventors: Grant S. Peterson, Metamora, IL (US); Randall T. Anderson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 849 days.

(21) Appl. No.: 13/036,991

(22) Filed: Feb. 28, 2011

(65) Prior Publication Data

US 2012/0216519 A1 Aug. 30, 2012

(51) Int. Cl.

*F16H 61/28* (2006.01)
*F15B 21/08* (2006.01)
*E02F 9/22* (2006.01)

(52) U.S. Cl.

CPC ....... *F15B 21/087* (2013.01); *F15B 2211/6346* (2013.01); *F15B 2211/30575* (2013.01); *F15B 2211/20546* (2013.01); *E02F 9/2228* (2013.01); *E02F 9/2296* (2013.01); *F15B 2211/20523* (2013.01); *F15B 2211/6323* (2013.01); *F15B 2211/6309* (2013.01)
USPC ................................................ 60/459; 91/433

(58) Field of Classification Search

USPC .......................... 60/420, 459; 91/433; 701/50
See application file for complete search history.

(56) References Cited

U.S. PATENT DOCUMENTS 5,832,805 A 11/1998 Kurashima et al.
6,286,412 B1 * 9/2001 Manring et al. ................ 91/433
6,321,152 B1 11/2001 Amborski et al.
6,775,974 B2 8/2004 Tabor
6,912,849 B2 7/2005 Inoue et al.
7,146,808 B2 * 12/2006 Devier et al. .................. 60/459
7,260,931 B2 8/2007 Egelja et al.
7,614,336 B2 * 11/2009 VerKuilen et al. .............. 91/454
7,665,299 B2 2/2010 Schuh et al.

(Continued)

FOREIGN PATENT DOCUMENTS

EP 1300595 4/2003
EP 1338832 8/2003
KR 100683577 2/2007

OTHER PUBLICATIONS

Phanindra Garimella et al., "Fault Detection of an Electro-Hydraulic Cylinder Using Adaptive Robus Observers," IMECE2004-61718, 2004 ASME International Mechanical Engineering Congress and Exposition, Nov. 13-20, 2004.

(Continued)

*Primary Examiner* — Thomas E Lazo
(74) *Attorney, Agent, or Firm* — Finnegan, Henderson, Farabow, Garrett & Dunner LLP

(57) ABSTRACT

A hydraulic control system is disclosed. The hydraulic control system may have a hydraulic actuator, a valve arrangement, and an operator input device configured to generate a first signal indicative of a desired hydraulic actuator velocity. The hydraulic control system may also have a sensor configured to generate a second signal indicative of an actual flow rate of fluid entering the hydraulic actuator, and a controller. The controller may be configured to determine a desired flow rate of fluid into the hydraulic actuator based on the first signal; to estimate the actual flow rate based on the desired flow rate, a correction flow rate, and a system response model; and to determine the actual flow rate based on the second signal. The controller may also be configured to make a comparison of the estimated and determined actual flow rates of fluid, and to determine the correction flow rate based on the comparison.

20 Claims, 3 Drawing Sheets

(56) References Cited

U.S. PATENT DOCUMENTS

| | | | | |
|---|---|---|---|---|
| 7,712,309 | B2 | 5/2010 | Vigholm | |
| 7,853,382 | B2 * | 12/2010 | Anderson | 701/50 |
| 2002/0108486 | A1 | 8/2002 | Sannomiya et al. | |
| 2003/0121551 | A1 | 7/2003 | Hajek | |
| 2003/0158646 | A1 | 8/2003 | Nishida et al. | |
| 2010/0229705 | A1 | 9/2010 | Christoforou et al. | |

OTHER PUBLICATIONS

U.S. Patent Application of Grant S. Peterson et al. entitled “Hydraulic Control System Having Cylinder Stall Strategy” filed on Feb. 28, 2011.

U.S. Patent Application of Grant S. Peterson et al. entitled “Hydraulic Control System Implementing Pump Torque Limiting” filed on Feb. 28, 2011.

* cited by examiner

HYDRAULIC CONTROL SYSTEM HAVING CYLINDER FLOW CORRECTION

TECHNICAL FIELD

The present disclosure relates generally to a hydraulic control system, and more particularly, to a hydraulic control system that implements cylinder flow correction.

BACKGROUND

Machines such as wheel loaders, excavators, dozers, motor graders, and other types of heavy equipment use multiple actuators supplied with hydraulic fluid from one or more pumps on the machine to accomplish a variety of tasks. These actuators are typically velocity controlled based on, among other things, an actuation position of an operator interface device. In particular, when an operator moves a particular interface device to a specific displaced position, the operator expects a corresponding hydraulic actuator to move at a predetermined velocity in a desired direction. This predetermined velocity and associated fluid flow into the actuator required to produce the velocity are, however, generally fixed within permanent relationship maps during testing of a similar test machine at a manufacturing facility, and may not account for machine-to-machine variability. Accordingly, every machine may behave somewhat differently when actuated in the same manner by the same operator. If left unchecked, this variability could cause reduced machine control, performance, and efficiency.

One attempt to reduce the effects of machine-to-machine variability in the control of a position-in, velocity-out hydraulic system is disclosed in U.S. Pat. No. 6,775,974 that issued to Tabor on Aug. 17, 2004 (the '974 patent). In particular, the '974 patent describes a hydraulic system having a joystick movable by an operator to produce an electrical signal indicative of a direction and a desired rate at which a corresponding hydraulic actuator is to move. The hydraulic system also has a pressure sensor configured to sense a system pressure at an electro-hydraulic proportional valve associated with the hydraulic actuator, and a controller in communication with the joystick, the pressure sensor, and the electro-hydraulic proportional valve. The controller is configured to request a desired velocity for the hydraulic actuator based on the electrical signal, and determine varying forces acting on the hydraulic actuator based on a signal from the pressure sensor. The controller is further configured to determine a unique valve flow coefficient, which characterizes fluid flow through the particular electro-hydraulic proportional valve, that is required to achieve the desired velocity. Activation of the electro-hydraulic valve is then performed based on the valve flow coefficient.

Although the system of the '974 patent may be potentially helpful in reducing machine-to-machine variability, it may still be less than optimal and lack applicability. In particular, the system of the '974 patent may fail to consider system delays inherent to pump and cylinder response, as well as valve behavior during cylinder movement. In addition, the system may lack applicability to machines where pressure variations at the valve do not substantially affect flow through the valve.

The disclosed hydraulic control system is directed to overcoming one or more of the problems set forth above and/or other problems of the prior art.

SUMMARY

In one aspect, the present disclosure is directed to a hydraulic control system. The hydraulic control system may include a hydraulic actuator, a valve arrangement configured to meter pressurized fluid into the hydraulic actuator, and an operator input device configured to generate a first signal indicative of a desired velocity of the hydraulic actuator. The hydraulic control system may also include a sensor configured to generate a second signal indicative of an actual flow rate of fluid entering the hydraulic actuator, and a controller in communication with the valve arrangement, the operator input device, and the sensor. The controller may be configured to determine a desired flow rate of fluid into the hydraulic actuator based on the first signal; to estimate the actual flow rate of fluid entering the hydraulic actuator based on the desired flow rate of fluid, a correction flow rate, and a system response model; and to determine the actual flow rate of fluid entering the hydraulic actuator based on the second signal. The controller may also be configured to make a comparison of the estimated and determined actual flow rates of fluid entering the hydraulic actuator, and to determine the correction flow rate based on the comparison.

In another aspect, the present disclosure is directed to a method of operating a machine. The method may include receiving an operator input indicative of a desired velocity of a hydraulic actuator, and determining a desired flow rate of fluid into the hydraulic actuator based on the desired velocity. The method may further include estimating an actual flow rate of fluid entering the hydraulic actuator based on the desired flow rate of fluid, a correction flow rate, and a system response model; and sensing an actual flow rate of fluid entering the hydraulic actuator. The method may additionally include making a comparison of the estimated and sensed actual flow rates of fluid entering the hydraulic actuator, and determining the correction flow rate based on the comparison.

DETAILED DESCRIPTION

Figure 1:
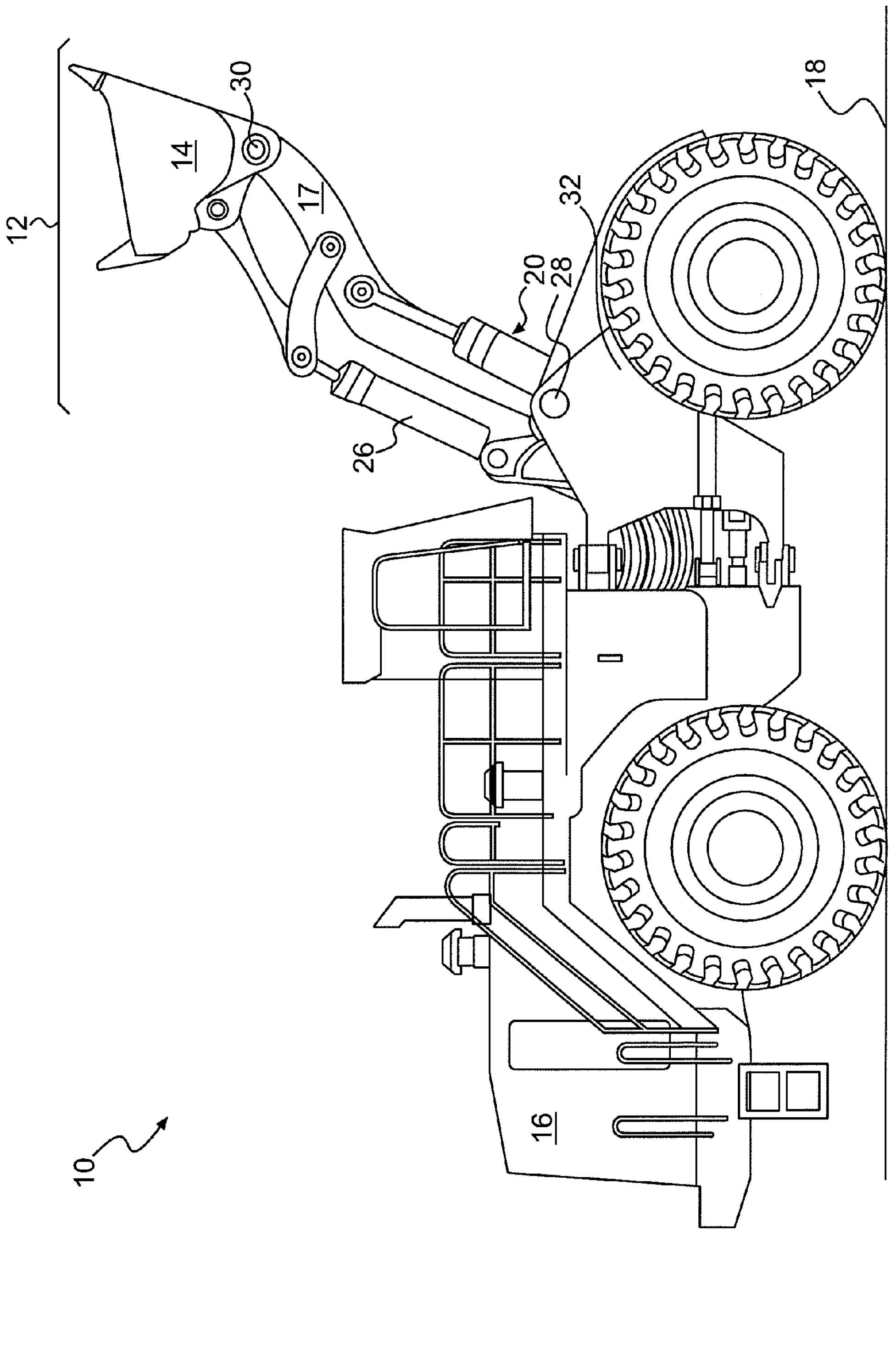
FIG. 1 is a side-view diagrammatic illustration of an exemplary disclosed machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or another industry known in the art. For example, machine 10 may be a material moving machine such as the loader depicted in FIG. 1. Alternatively, machine 10 could embody an excavator, a dozer, a backhoe, a motor grader, a dump truck, or another similar machine. Machine 10 may include, among other things, a linkage system 12 configured to move a work tool 14, and a prime mover 16 that provides power to linkage system 12.

Linkage system 12 may include structure acted on by fluid actuators to move work tool 14. Specifically, linkage system 12 may include a boom (i.e., a lifting member) 17 that is vertically pivotable about a horizontal axis 28 relative to a work surface 18 by a pair of adjacent, double-acting, hydraulic cylinders 20 (only one shown in FIG. 1). Linkage system 12 may also include a single, double-acting, hydraulic cylinder 26 connected to tilt work tool 14 relative to boom 17 in a vertical direction about a horizontal axis 30. Boom 17 may be pivotably connected at one end to a body 32 of machine 10, while work tool 14 may be pivotably connected to an opposing end of boom 17. It should be noted that alternative linkage configurations may also be possible.

Numerous different work tools 14 may be attachable to a single machine 10 and controlled to perform a particular task. For example, work tool 14 could embody a bucket (shown in FIG. 1), a fork arrangement, a blade, a shovel, a ripper, a dump bed, a broom, a snow blower, a propelling device, a cutting device, a grasping device, or another task-performing device known in the art. Although connected in the embodiment of FIG. 1 to lift and tilt relative to machine 10, work tool 14 may alternatively or additionally pivot, rotate, slide, swing, or move in any other appropriate manner.

Prime mover 16 may embody an engine such as, for example, a diesel engine, a gasoline engine, a gaseous fuel-powered engine, or another type of combustion engine known in the art that is supported by body 32 of machine 10 and operable to power the movements of machine 10 and work tool 14. It is contemplated that prime mover may alternatively embody a non-combustion source of power, if desired, such as a fuel cell, a power storage device (e.g., a battery), or another source known in the art. Prime mover 16 may produce a mechanical or electrical power output that may then be converted to hydraulic power for moving hydraulic cylinders 20 and 26.

Figure 2:
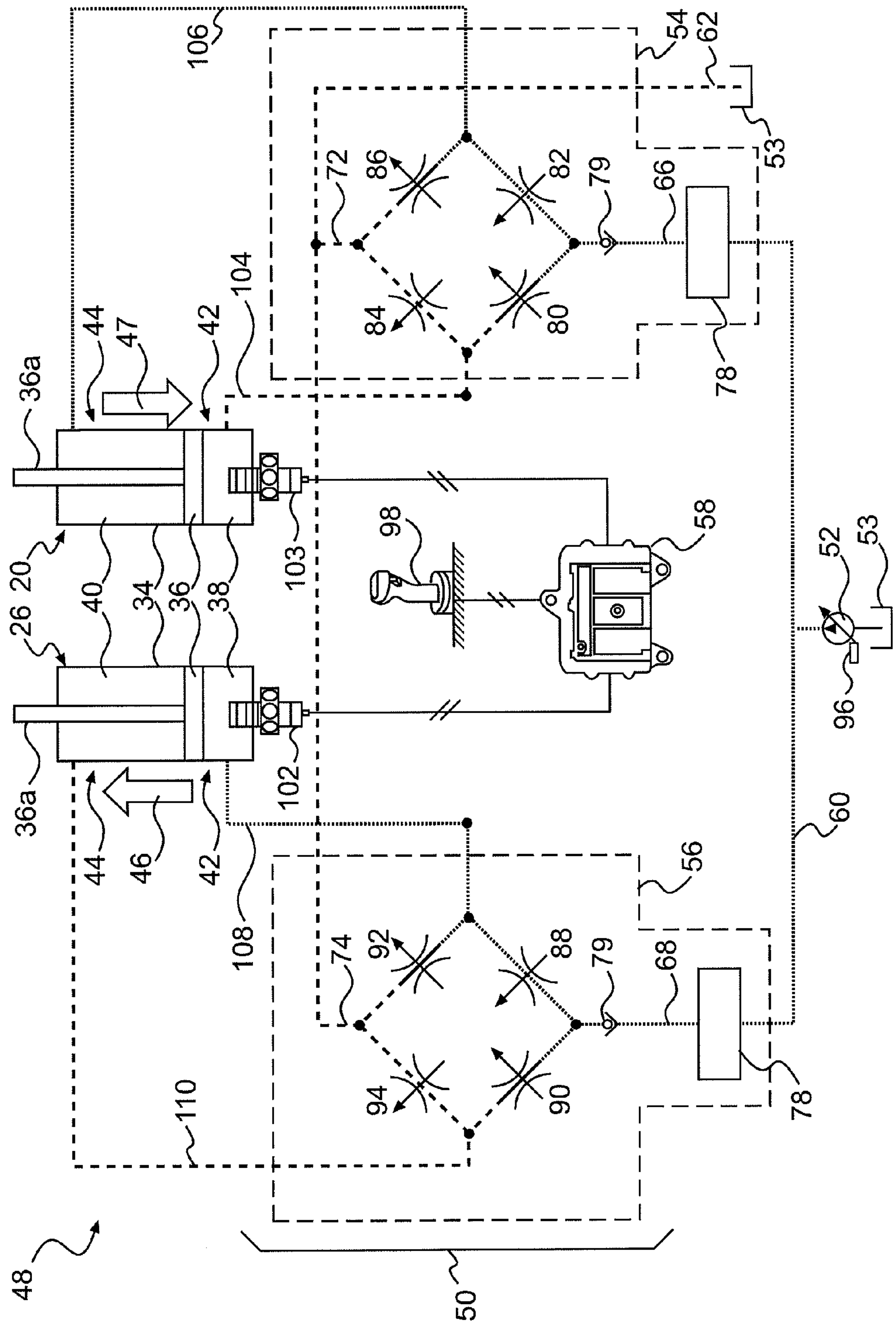
FIG. 2 is a schematic illustration of an exemplary disclosed hydraulic control system that may be used in conjunction with the machine of FIG. 1.

For purposes of simplicity, FIG. 2 illustrates the composition and connections of only hydraulic cylinder 26 and one of hydraulic cylinders 20. It should be noted, however, that machine 10 may include other hydraulic actuators of similar composition connected to move the same or other structural members of linkage system 12 in a similar manner, if desired.

As shown in FIG. 2, each of hydraulic cylinders 20 and 26 may include a tube 34 and a piston assembly 36 arranged within tube 34 to form a first chamber 38 and a second chamber 40. In one example, a rod portion 36*a* of piston assembly 36 may extend through an end of second chamber 40. As such, second chamber 40 may be associated with a rod-end 44 of its respective cylinder, while first chamber 38 may be associated with an opposing head-end 42 of its respective cylinder.

First and second chambers 38, 40 may each be selectively supplied with pressurized fluid and drained of the pressurized fluid to cause piston assembly 36 to displace within tube 34, thereby changing an effective length of hydraulic cylinders 20, 26 and moving work tool 14 (referring to FIG. 1). A flow rate of fluid into and out of first and second chambers 38, 40 may relate to a velocity of hydraulic cylinders 20, 26 and work took 14, while a pressure differential between first and second chambers 38, 40 may relate to a force imparted by hydraulic cylinders 20, 26 on work tool 14. An expansion (represented by an arrow 46) and a retraction (represented by an arrow 47) of hydraulic cylinders 20, 26 may function to assist in moving work tool 14 in different manners (e.g., lifting and tilting work tool 14, respectively).

To help regulate filling and draining of first and second chambers 38, 40, machine 10 may include a hydraulic control system 48 having a plurality of interconnecting and cooperating fluid components. Hydraulic control system 48 may include, among other things, a valve stack 50 at least partially forming a circuit between hydraulic cylinders 20, 26, an engine-driven pump 52, and a tank 53. Valve stack 50 may include a lift valve arrangement 54, a tilt valve arrangement 56, and, in some embodiments, one or more auxiliary valve arrangements (not shown) that are fluidly connected to receive and discharge pressurized fluid in parallel fashion. In one example, valve arrangements 54, 56 may include separate bodies bolted to each other to form valve stack 50. In another embodiment, each of valve arrangements 54, 56 may be stand-alone arrangements, connected to each other only by way of external fluid conduits (not shown). It is contemplated that a greater number, a lesser number, or a different configuration of valve arrangements may be included within valve stack 50, if desired. For example, a swing valve arrangement (not shown) configured to control a swinging motion of linkage system 12, one or more travel valve arrangements, and other suitable valve arrangements may be included within valve stack 50. Hydraulic control system 48 may further include a controller 58 in communication with valve arrangements 54, 56 to control corresponding movements of hydraulic cylinders 20, 26.

Each of lift and tilt valve arrangements 54, 56 may regulate the motion of their associated fluid actuators. Specifically, lift valve arrangement 54 may have elements movable to simultaneously control the motions of both of hydraulic cylinders 20 and thereby lift boom 17 relative to work surface 18. Likewise, tilt valve arrangement 56 may have elements movable to control the motion of hydraulic cylinder 26 and thereby tilt work tool 14 relative to boom 17. During a lowering movement of boom 17 and a downward tilting movement of work tool 14, hydraulic cylinders 20, 26 may be assisted by the force of gravity. In contrast, during upward lifting and tilting movements, hydraulic cylinders 20, 26 may be working against the force of gravity.

Valve arrangements 54, 56 may be connected to regulate flows of pressurized fluid to and from hydraulic cylinders 20, 26 via common passages. Specifically, valve arrangements 54, 56 may be connected to pump 52 by way of a common supply passage 60, and to tank 53 by way of a common drain passage 62. Lift and tilt valve arrangements 54, 56 may be connected in parallel to common supply passage 60 by way of individual fluid passages 66 and 68, respectively, and in parallel to common drain passage 62 by way of individual fluid passages 72 and 74, respectively. A pressure compensating valve 78 and/or a check valve 79 may be disposed within each of fluid passages 66, 68 to provide a unidirectional supply of fluid having a substantially constant flow to valve arrangements 54, 56. Pressure compensating valves 78 may be pre- (shown in FIG. 2) or post-compensating (not shown) valves movable, in response to a differential pressure, between a flow passing position and a flow blocking position such that a substantially constant flow of fluid is provided to valve arrangements 54 and 56, even when a pressure of the fluid directed to pressure compensating valves 78 varies. It is contemplated that, in some applications, pressure compensating valves 78 and/or check valves 79 may be omitted, if desired.

Each of lift and tilt valve arrangements 54, 56 may be substantially identical and include four independent metering valves (IMVs). Of the four IMVs, two may be generally associated with fluid supply functions, while two may be generally associated with drain functions. For example, lift valve arrangement 54 may include a head-end supply valve 80, a rod-end supply valve 82, a head-end drain valve 84, and a rod-end drain valve 86. Similarly, tilt valve arrangement 56 may include a head-end supply valve 88, a rod-end supply valve 90, a head-end drain valve 92, and a rod-end drain valve 94.

Head-end supply valve 80 may be disposed between fluid passage 66 and a fluid passage 104 that leads to first chamber 38 of hydraulic cylinder 20, and be configured to regulate a flow rate of pressurized fluid into first chamber 38 in response to a flow command from controller 58. Head-end supply valve 80 may include a variable-position, spring-biased valve element, for example a poppet or spool element, that is solenoid actuated and configured to move to any position between a first end-position at which fluid is allowed to flow into first chamber 38, and a second end-position at which fluid flow is blocked from first chamber 38. It is contemplated that head-end supply valve 80 may include additional or different elements such as, for example, a fixed-position valve element or any other valve element known in the art. It is also contemplated that head-end supply valve 80 may alternatively be hydraulically actuated, mechanically actuated, pneumatically actuated, or actuated in another suitable manner.

Rod-end supply valve 82 may be disposed between fluid passage 66 and a fluid passage 106 leading to second chamber 40 of hydraulic cylinder 20, and be configured to regulate a flow rate of pressurized fluid into second chamber 40 in response to a flow command from controller 58. Rod-end supply valve 82 may include a variable-position, spring-biased valve element, for example a poppet or spool element, that is solenoid actuated and configured to move to any position between a first end-position at which fluid is allowed to flow into second chamber 40, and a second end-position at which fluid is blocked from second chamber 40. It is contemplated that rod-end supply valve 82 may include additional or different valve elements such as, for example, a fixed-position valve element or any other valve element known in the art. It is also contemplated that rod-end supply valve 82 may alternatively be hydraulically actuated, mechanically actuated, pneumatically actuated, or actuated in another suitable manner.

Head-end drain valve 84 may be disposed between fluid passage 104 and fluid passage 72, and be configured to regulate a flow rate of pressurized fluid from first chamber 38 of hydraulic cylinder 20 to tank 53 in response to a flow command from controller 58. Head-end drain valve 84 may include a variable-position, spring-biased valve element, for example a poppet or spool element, that is solenoid actuated and configured to move to any position between a first end-position at which fluid is allowed to flow from first chamber 38, and a second end-position at which fluid is blocked from flowing from first chamber 38. It is contemplated that head-end drain valve 84 may include additional or different valve elements such as, for example, a fixed-position valve element or any other valve element known in the art. It is also contemplated that head-end drain valve 84 may alternatively be hydraulically actuated, mechanically actuated, pneumatically actuated, or actuated in another suitable manner.

Rod-end drain valve 86 may be disposed between fluid passage 106 and fluid passage 72, and be configured to regulate a flow rate of pressurized fluid from second chamber 40 of hydraulic cylinder 20 to tank 53 in response to a flow command from controller 58. Rod-end drain valve 86 may include a variable-position, spring-biased valve element, for example a poppet or spool element, that is solenoid actuated and configured to move to any position between a first end-position at which fluid is allowed to flow from second chamber 40, and a second end-position at which fluid is blocked from flowing from second chamber 40. It is contemplated that rod-end drain valve 86 may include additional or different valve elements such as, for example, a fixed-position valve element or any other valve element known in the art. It is also contemplated that rod-end drain valve 86 may alternatively be hydraulically actuated, mechanically actuated, pneumatically actuated, or actuated in another suitable manner.

Head-end supply valve 88 may be disposed between fluid passage 68 and a fluid passage 108 that leads to first chamber 38 of hydraulic cylinder 26, and be configured to regulate a flow rate of pressurized fluid into first chamber 38 in response to a flow command from controller 58. Head-end supply valve 88 may include a variable-position, spring-biased valve element, for example a poppet or spool element, that is solenoid actuated and configured to move to any position between a first end-position at which fluid is allowed to flow into first chamber 38, and a second end-position at which fluid flow is blocked from first chamber 38. It is contemplated that head-end supply valve 88 may include additional or different elements such as, for example, a fixed-position valve element or any other valve element known in the art. It is also contemplated that head-end supply valve 88 may alternatively be hydraulically actuated, mechanically actuated, pneumatically actuated, or actuated in another suitable manner.

Rod-end supply valve 90 may be disposed between fluid passage 68 and a fluid passage 110 that leads to second chamber 40 of hydraulic cylinder 26, and be configured to regulate a flow rate of pressurized fluid into second chamber 40 in response to a flow command from controller 58. Specifically, rod-end supply valve 90 may include a variable-position, spring-biased valve element, for example a poppet or spool element, that is solenoid actuated and configured to move to any position between a first end-position, at which fluid is allowed to flow into second chamber 40, and a second end-position, at which fluid is blocked from second chamber 40. It is contemplated that rod-end supply valve 90 may include additional or different valve elements such as, for example, a fixed-position valve element or any other valve element known in the art. It is also contemplated that rod-end supply valve 90 may alternatively be hydraulically actuated, mechanically actuated, pneumatically actuated, or actuated in another suitable manner.

Head-end drain valve 92 may be disposed between fluid passage 108 and fluid passage 74, and be configured to regulate a flow rate of pressurized fluid from first chamber 38 of hydraulic cylinder 26 to tank 53 in response to a flow command from controller 58. Specifically, head-end drain valve 92 may include a variable-position, spring-biased valve element, for example a poppet or spool element, that is solenoid actuated and configured to move to any position between a first end-position at which fluid is allowed to flow from first chamber 38, and a second end-position at which fluid is blocked from flowing from first chamber 38. It is contemplated that head-end drain valve 92 may include additional or different valve elements such as, for example, a fixed-position valve element or any other valve element known in the art. It is also contemplated that head-end drain valve 92 may alternatively be hydraulically actuated, mechanically actuated, pneumatically actuated, or actuated in another suitable manner.

Rod-end drain valve 94 may be disposed between fluid passage 110 and fluid passage 74, and be configured to regulate a flow rate of pressurized fluid from second chamber 40 of hydraulic cylinder 26 to tank 53 in response to a flow command from controller 58. Rod-end drain valve 94 may include a variable-position, spring-biased valve element, for example a poppet or spool element, that is solenoid actuated and configured to move to any position between a first end-position at which fluid is allowed to flow from second chamber 40, and a second end-position at which fluid is blocked from flowing from second chamber 40. It is contemplated that rod-end drain valve 94 may include additional or different valve element such as, for example, a fixed-position valve element or any other valve elements known in the art. It is also contemplated that rod-end drain valve 94 may alternatively be hydraulically actuated, mechanically actuated, pneumatically actuated, or actuated in another suitable manner.

Pump 52 may have variable displacement and be load-sense controlled to draw fluid from tank 53 and discharge the fluid at a specified elevated pressure to valve arrangements 54, 56. That is, pump 52 may include a stroke-adjusting mechanism 96, for example a swashplate or spill valve, a position of which is hydro-mechanically adjusted based on a sensed load of hydraulic control system 48 to thereby vary an output (e.g., a discharge rate) of pump 52. The displacement of pump 52 may be adjusted from a zero displacement position at which substantially no fluid is discharged from pump 52, to a maximum displacement position at which fluid is discharged from pump 52 at a maximum rate. In one embodiment, a load-sense passage (not shown) may direct a pressure signal to stroke-adjusting mechanism 96 and, based on a value of that signal (i.e., based on a pressure of signal fluid within the passage), the position of stroke-adjusting mechanism 96 may change to either increase or decrease the output of pump 52 and thereby maintain the specified pressure. Pump 52 may be drivably connected to prime mover 16 of machine 10 by, for example, a countershaft, a belt, or in another suitable manner. Alternatively, pump 52 may be indirectly connected to prime mover 16 via a torque converter, a gear box, an electrical circuit, or in any other manner known in the art.

Tank 53 may constitute a reservoir configured to hold a supply of fluid. The fluid may include, for example, a dedicated hydraulic oil, an engine lubrication oil, a transmission lubrication oil, or any other fluid known in the art. One or more hydraulic circuits within machine 10 may draw fluid from and return fluid to tank 53. It is also contemplated that hydraulic control system 48 may be connected to multiple separate fluid tanks, if desired.

Controller 58 may embody a single microprocessor or multiple microprocessors that include components for controlling valve arrangements 54, 56 based on, among other things, input from an operator of machine 10 and one or more sensed operational parameters. Numerous commercially available microprocessors can be configured to perform the functions of controller 58. It should be appreciated that controller 58 could readily be embodied in a general machine microprocessor capable of controlling numerous machine functions. Controller 58 may include a memory, a secondary storage device, a processor, and any other components for running an application. Various other circuits may be associated with controller 58 such as power supply circuitry, signal conditioning circuitry, solenoid driver circuitry, and other types of circuitry.

Controller 58 may receive operator input associated with a desired movement of machine 10 by way of one or more interface devices 98 that are located within an operator station of machine 10. Interface devices 98 may embody, for example, single or multi-axis joysticks, levers, or other known interface devices located proximate an onboard operator seat (if machine 10 is directly controlled by an onboard operator) or located within a remote station offboard machine 10. Each interface device 98 may be a proportional-type device that is movable through a range from a neutral position to a maximum displaced position to generate a corresponding displacement signal that is indicative of a desired velocity of work tool 14 caused by hydraulic cylinders 20, 26, for example a desired tilting and/or lifting velocity of work tool 14. The lifting and tilting desired velocity signals may be generated independently or simultaneously by the same or different interface devices 98, and be directed to controller 58 for further processing.

One or more maps relating the interface device position signals, the corresponding desired work tool velocities, associated flow rates, valve element positions, system pressures, and/or other characteristics of hydraulic control system 48 may be stored in the memory of controller 58. Each of these maps may be in the form of tables, graphs, and/or equations. In one example, desired work tool velocity and commanded flow rates may form the coordinate axis of a 2-D table for control of head- and rod-end supply valves 80, 82, 88, 90. The commanded flow rates required to move hydraulic cylinders 20, 26 at the desired velocities and corresponding valve element positions of the appropriate valve arrangements 54, 56 may be related in the same or another separate 2- or 3-D map, as desired. It is also contemplated that desired velocity may alternatively be directly related to the valve element position in a single 2-D map. Controller 58 may be configured to allow the operator to directly modify these maps and/or to select specific maps from available relationship maps stored in the memory of controller 58 to affect actuation of hydraulic cylinders 20, 26. It is also contemplated that the maps may be automatically selected for use by controller 58 based on sensed or determined modes of machine operation, if desired.

Controller 58 may be configured to receive input from interface device 98 and to command operation of valve arrangements 54, 56 in response to the input and based on the relationship maps described above. Specifically, controller 58 may receive the interface device position signal indicative of a desired work tool velocity, and reference the selected and/or modified relationship maps stored in the memory of controller 58 to determine desired flow rates for the appropriate supply and/or drain elements within valve arrangements 54, 56. In conventional hydraulic systems, the desired flow rates would then be commanded of the appropriate supply and drain elements to cause filling of particular chambers within hydraulic cylinders 20, 26 at rates that correspond with the desired work tool velocities. However, machine-to-machine variability (e.g., variability between supply and drain valve elements, pumps, and actuators) could result in performance variability of the conventional systems that is unexpected and/or undesired. In fact, in some systems, machine-to-machine variability has been shown to account for up to 30% error in the desired work tool velocities (i.e., velocities that are 30% lower higher than the desired velocities). Accordingly, controller 58, as will be described in more detail in the following section, may be configured to accommodate the machine-to-machine variability by selectively correcting the desired flow rates mapped out for individual valve arrangements based on monitored and modeled performance factors.

Controller 58 may rely, at least in part, on measured flow rates of fluid entering each hydraulic cylinder 20, 26 to account for machine-to-machine variability. The measured flow rates may be directly or indirectly sensed by one or more sensors 102, 103. In the disclosed embodiment, each of sensors 102, 103 may embody a magnetic pickup-type sensor associated with a magnet (not shown) embedded within the piston assembly 36 of different hydraulic cylinders 20, 26. In this configuration, sensors 102, 103 may each be configured to detect an extension position of the corresponding hydraulic cylinder 20, 26 by monitoring the relative location of the magnet, indexing position changes to time, and generating corresponding velocity signals. As hydraulic cylinders 20, 26 extend and retract, sensors 102, 103 may generate and direct the velocity signals to controller 58 for further processing. It is contemplated that sensors 102, 103 may alternatively embody other types of sensors such as, for example, magnetostrictive-type sensors associated with a wave guide (not shown) internal to hydraulic cylinders 20, 26, cable type sensors associated with cables (not shown) externally mounted to hydraulic cylinders 20, 26, internally- or externally-mounted optical sensors, rotary style sensors associated with a joint pivotable by hydraulic cylinders 20, 26, or any other type of sensors known in the art. It is further contemplated that sensors 102, 103 may alternatively only be configured to generate signals associated with the extension and retraction positions of hydraulic cylinders 20, 26, with controller 58 then indexing the position signals according to time and thereby determining the velocities of hydraulic cylinders 20, 26 based on the position signals from sensors 102, 103. From the velocity information provided by sensors 102, 103 and based on known geometry and/or kinematics of hydraulic cylinders 20, 26 (e.g., flow areas), controller 58 may be configured to calculate the flow rates of fluid entering hydraulic cylinders 20, 26. That is, the flow rate of fluid entering a particular cylinder may be calculated by controller 58 as a function of that cylinder's velocity and its cross-sectional flow area.

Figure 3:
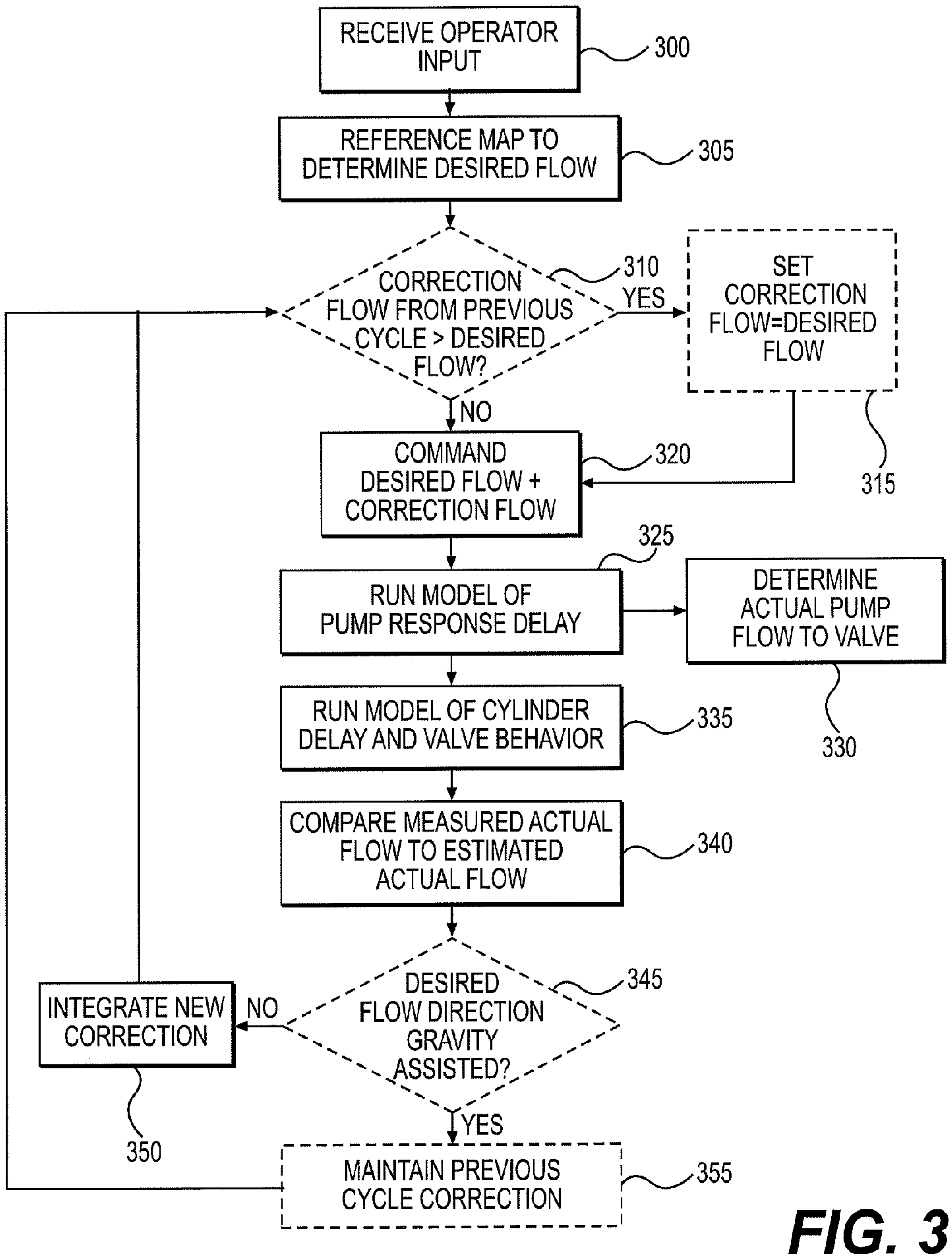
FIG. 3 is a flow chart illustrating an exemplary disclosed method performed by the hydraulic control system of FIG. 2.

FIG. 3 illustrates an exemplary flow-correcting operation performed by controller 58. FIG. 3 will be discussed in more detail in the following section to further illustrate the disclosed concepts.

INDUSTRIAL APPLICABILITY

The disclosed hydraulic control system may be applicable to any machine that includes multiple fluid actuators where controllability, productivity, and efficiency are issues. The disclosed hydraulic control system may enhance controllability, productivity, and efficiency by selectively correcting desired flow rates commanded of individual valve arrangements based on monitored and modeled performance factors. Operation of hydraulic control system 48 will now be explained.

During operation of machine 10, a machine operator may manipulate interface device 98 to request a corresponding movement of work tool 14. The displacement position of interface device 98 may be related to an operator desired velocity of work tool 14. Interface device 98 may generate a position signal indicative of the operator desired velocity of work tool 14 during manipulation, and direct this position signal to controller 58 for further processing.

Controller 58 may receive the operator interface device position signal (Step 300) and reference the maps stored in memory to determine a desired velocity for the appropriate cylinder 20, 26 of hydraulic control system 48 and the corresponding desired flow rate (Step 305) that should cause that cylinder 20, 26 to move at the desired velocity. Controller 58 may then apply a correction flow rate to the desired flow rate, and command the resulting total flow rate of the appropriate supply and drain elements of valve arrangements 54, 56 to move the corresponding hydraulic cylinder 20, 26 at the desired velocity requested by the operator (Step 320). In the disclosed embodiment, the correction flow rate may be an arrangement-specific flow rate that is added to or subtracted from the desired flow rate. In another embodiment, however, the correction flow rate may instead be or additionally include a scaling factor that multiplies the desired flow rate for a certain arrangement by a particular amount.

In some embodiments, the correction flow rate may first be limited, if desired, before being applied to the desired flow rate for the certain arrangement. For example, controller 58 may be configured to compare a magnitude of the correction flow rate to a magnitude of the desired flow rate (Step 310), and set the magnitude of the correction flow rate about equal to the magnitude of the desired flow rate (Step 315) when the correction flow rate magnitude is greater than the desired flow rate magnitude. By limiting the correction flow rate, it may be ensured that the correction flow rate will not result in a total flow rate that is excessive or a total flow rate that is in a direction opposite the work tool movement direction that is desired by the operator. For example, if the desired flow rate for a particular valve arrangement is 50 lpm (liters per minute), but the correction flow rate is −55 lpm, the resulting total flow rate would be −5 lpm, resulting in a cylinder movement direction that is opposite to that being requested. Instead, in this example, the correction flow rate may be limited to −50 lpm, such that the total flow rate would instead be 0 lpm. It is contemplated that steps 310-315 may be omitted, if desired.

The correction flow rate applied to the desired flow rate may be determined through the use of a system response model. In particular, controller 58 may provide the desired flow rate determined in Step 305 as input to the system response model to estimate how hydraulic control system 48 will respond to a valve arrangement command to meter the desired flow rate into a corresponding cylinder. In the disclosed embodiment, the system response model may consist of three different portions, including a pump response portion, a cylinder response portion, and a valve behavior portion. Each portion of the system response model may include one or more equations, algorithms, maps, and/or subroutines that function to predict the physical response and/or behavior of the specified portion of hydraulic control system 48. Each of the equations, algorithms, maps, and/or subroutines may be developed during manufacture of machine 10 and periodically updated and/or uniquely tuned based on actual operating conditions of individual machines 10.

At about the same time as (e.g., just before or just after) commanding the appropriate one of valve arrangements 54, 56 to meter fluid at the total flow rate about equal to the desired flow rate plus the correction flow rate, controller 58 may run the pump portion of the system response model to determine how pump 52 (referring to FIG. 2) might respond to the flow rate metering commanded by controller 58 (Step 325). That is, the pump portion of the system response model may be used by controller 58 to estimate a delay between a time when the flow rate metering command is issued by controller 58 to the appropriate valve arrangement 54, 56, and a time when adjusting mechanism 96 (referring to FIG. 2) begins to adjust the displacement of pump 52 and respond to system pressure fluctuations caused by the metering. That is, even after the flow rate metering command is issued by controller 58, some time may lapse before system pressure droops and pump 52 mechanically responds to the droop with increased displacement that raises pressure back up to where it should be maintained. During this time, fluid flow through the system (e.g., through the corresponding valve arrangement into the appropriate cylinder) may fluctuate, resulting in changing velocities of the cylinder. In addition to estimating the associated pump response time delay, the pump portion of the system response model may also be configured to model the actual pump flow that is directed to the corresponding valve arrangement 54, 56 (Step 330). This information concerning the pump's output may subsequently be used for control of pump 52 and/or other functions of machine 10.

After completion of Step 325, controller 58 may be configured to run the cylinder delay and valve behavior portions of the system response model to determine an estimated actual flow through the corresponding valve arrangement 54, 56 to the appropriate hydraulic cylinder 20, 26 at a particular instant in time following issuance of the metering command (Step 335). Specifically, controller 58 may use the cylinder delay portion of the system response model to estimate a delay between the time when adjusting mechanism 96 begins to adjust the displacement of pump 52 and respond to system pressure fluctuations caused by the commanded metering, and a time when effects of the adjusting are experienced by the corresponding hydraulic cylinder. In other words, the cylinder response model may be used by controller 58 to determine the delay between a displacement adjustment of pump 52 and a change in the actual flow rate into and velocity of the corresponding hydraulic cylinder 20, 26 caused by the adjustment. Controller 58 may then use the valve behavior portion of the system response model to determine how movements of the corresponding valve arrangement 54, 56 may affect cylinder velocity after the time when the displacement adjustment of pump 52 has affected the cylinder velocity (i.e., after the cylinder response delay period). In other words, after the displacement of pump 52 has been adjusted to change the flow rate of fluid directed into the corresponding hydraulic cylinder 20, 26, the valve behavior portion may then be utilized by controller 58 to model how movements of the corresponding valve arrangement 54, 56 may affect that flow rate.

Based on information from the system response model, controller 58 may be configured to estimate an actual flow rate of fluid entering the corresponding hydraulic cylinder 20, 26 at any point in time, and compare that estimated actual flow rate to an actual flow rate measured by way of sensors 102, 103 (Step 340). This comparison may provide an indication as to how well the total flow rate metering commanded of valve arrangements 54, 56 (i.e., desired flow rate+correction flow rate) results in the operator desired velocity of work tool 14. In particular, an error value substantially proportional to the difference between the estimated actual and the measured actual flow rates may be generated during Step 340 and used by controller 58 to adjust the correction flow rate during a subsequently requested movement of hydraulic cylinders 20, 26 (i.e., during a subsequent control cycle when the system response model is again utilized). In other words, the correction flow rate utilized in Step 320 during a current machine movement may be a correction flow rate adjusted during an immediately previous control cycle. In the disclosed example, the adjustments from sequential cycles may be integrated to form the correction flow rate (Step 350).

In some situations, controller 58 may be configured to consider the movement direction requested by the operator in Step 300. Specifically, controller 58 may be configured to determine if the requested movement of work tool 14 is in general alignment with the force of gravity (Step 345) (i.e., when the requested flow direction causes the corresponding hydraulic cylinder 20, 26 to move with or against gravity), and respond differently according to the determination. When the requested movement is against the force of gravity (e.g., when work tool 14 is lifting or tilting upward), control may proceed through step 350, as described above. However, when the requested movement is in alignment with the force of gravity (e.g., when work tool 14 is lowering or tilting downward), controller 58 may be configured to maintain without change the correction flow rate determined during the immediately previous control cycle utilizing the system response model (Step 355) (i.e., the adjustment to the correction flow rate may not be integrated). In this manner, the effects of gravity causing a cylinder to move faster than possible with the commanded flow rate of fluid may be avoided and the integrity of the correction flow rate preserved, thereby providing stability to hydraulic control system 48.

The disclosed hydraulic control system 48 may help to improve the control, productivity, and efficiency of machine 10. Specifically, hydraulic control system 48 may be configured to monitor actual flow rates of fluid supplied to hydraulic cylinders 20, 26, and tailor corresponding flow rate commands to better match actual velocities of hydraulic cylinders 20, 26 to velocities desired and requested by the operator of machine 10. In this manner, machine-to-machine variability may be reduced, allowing for enhanced control, productivity, and efficiency.

It will be apparent to those skilled in the art that various modifications and variations can be made to the disclosed hydraulic control system. Other embodiments will be apparent to those skilled in the art from consideration of the specification and practice of the disclosed hydraulic control system. It is intended that the specification and examples be considered as exemplary only, with a true scope being indicated by the following claims and their equivalents.

What is claimed is:

1. A hydraulic control system, comprising:
a hydraulic actuator;
a valve arrangement configured to meter pressurized fluid into the hydraulic actuator;
an operator input device configured to generate a first signal indicative of a desired velocity of the hydraulic actuator;
a sensor configured to generate a second signal indicative of an actual flow rate of fluid entering the hydraulic actuator; and
a controller in communication with the valve arrangement, the operator input device, and the sensor, the controller being configured to:
determine a desired flow rate of fluid into the hydraulic actuator based on the first signal;
estimate the actual flow rate of fluid entering the hydraulic actuator based on the desired flow rate of fluid, a correction flow rate, and a system response model;
determine the actual flow rate of fluid entering the hydraulic actuator based on the second signal;
make a comparison of the estimated and determined actual flow rates of fluid entering the hydraulic actuator; and
determine the correction flow rate based on the comparison.

2. The hydraulic control system of claim 1, wherein the correction flow rate used to estimate the actual flow rate of fluid is determined from a previously executed cycle of the system response model.

3. The hydraulic control system of claim 1, wherein the sensor is at least one of a position sensor and a velocity sensor associated with the hydraulic actuator.

4. The hydraulic control system of claim 1, further including a variable displacement pump configured to pressurized fluid directed through the valve arrangement into the hydraulic actuator, wherein the system response model includes a first portion configured to model a first delay from a time that a command is sent by the controller to the valve arrangement to meter the desired and correction flow rates of fluid into the hydraulic actuator to a time that the variable displacement pump begins to respond to varying system pressures caused by metering of the valve arrangement.

5. The hydraulic control system of claim 4, wherein the controller is further configured to determine an actual pump flow rate to the valve arrangement based on the desired flow rate and the system response model.

6. The hydraulic control system of claim 4, wherein the system response model also includes a second portion configured to model a delay from the time that the variable displacement pump begins to respond to varying system pressures caused by metering of the valve arrangement to a time when movement of the hydraulic actuator is affected by the variable displacement pump responding.

7. The hydraulic control system of claim 4, wherein the system response model also includes a third portion configured to model behavior of the valve arrangement during movement of the hydraulic actuator.

8. The hydraulic control system of claim 1, wherein when the hydraulic actuator is being gravity assisted, the controller is configured to maintain a constant value for the correction flow rate during multiple uses of the system response model.

9. The hydraulic control system of claim 8, wherein when the hydraulic actuator is not being gravity assisted, the controller is configured to integrate the correction flow rate based on a difference between the estimated and determined actual flow rates.

10. The hydraulic control system of claim 9, further including a work tool movable by the hydraulic actuator, wherein the controller is configured to determine that the hydraulic actuator is being gravity assisted when the desired velocity of the hydraulic actuator is associated with a lowering or downward tilting motion of the work tool.

11. The hydraulic control system of claim 1, wherein the controller is further configured to limit a magnitude of the correction flow rate to a value about equal to a magnitude of the desired flow rate.

12. A method of operating a machine, comprising:
receiving an operator input indicative of a desired velocity of a hydraulic actuator;
determining a desired flow rate of fluid into the hydraulic actuator based on the desired velocity;
estimating an actual flow rate of fluid entering the hydraulic actuator based on the desired flow rate of fluid, a correction flow rate, and a system response model;
sensing an actual flow rate of fluid entering the hydraulic actuator;
making a comparison of the estimated and sensed actual flow rates of fluid entering the hydraulic actuator; and
determining the correction flow rate based on the comparison.

13. The method of claim 12, wherein the correction flow rate used to estimate the actual flow rate of fluid is determined from a previously executed cycle of the system response model.

14. The method of claim 12, further including:
pressurizing fluid;
commanding metering of the desired and correction flow rates of the pressurized fluid into the hydraulic actuator; and
adjusting pressurizing of the fluid based on a change in system pressure caused by the metering,
wherein estimating the actual flow rate based on the system response model includes estimating the actual flow rate based on a first portion of the system response model that is configured to model a first delay from a time that the metering is commanded to a time that the adjusting begins.

15. The method of claim 14, wherein estimating the actual flow rate based on the system response model also includes estimating the actual flow rate based on a second portion of the system response model that is configured to model a delay from the time that the adjusting begins to a time when movement of the hydraulic actuator is affected by the adjusting.

16. The method of claim 14, wherein estimating the actual flow rate based on the system response model also includes estimating the actual flow rate based on a third portion of the system response model that is configured to model the metering during movement of the hydraulic actuator.

17. The method of claim 12, further including:
determining that the hydraulic actuator is being gravity assisted; and
responsively maintaining a constant value for the correction flow rate during multiple uses of the system response model.

18. The method of claim 17, further including:
determining that the hydraulic actuator is not being gravity assisted; and
responsively integrating the correction flow rate based on a difference between the estimated and sensed actual flow rates.

19. The method of claim 12, further including limiting a magnitude of the correction flow rate to a value about equal to a magnitude of the desired flow rate.

20. A machine, comprising:
a prime mover;
a body configured to support the prime mover;
a tool;
a linkage system operatively connecting the tool to the body;
a hydraulic cylinder connected between the body and the linkage system or between the linkage system and the tool to move the tool;
a valve arrangement configured to meter pressurized fluid into the hydraulic cylinder;
an operator input device configured to generate a first signal indicative of a desired velocity of the hydraulic cylinder;
a pump driven by the prime mover to pressurize fluid directed to the hydraulic cylinder;
a sensor configured to sense a parameter indicative of an actual flow rate of fluid entering the hydraulic cylinder and to generate a corresponding second signal; and
a controller in communication with the valve arrangement, the operator input device, and the sensor, the controller being configured to:
determine a desired flow rate of fluid into the hydraulic cylinder based on the first signal;
estimate the actual flow rate of fluid entering the hydraulic cylinder based the desired flow rate of fluid, a correction flow rate, and a system response model;
determine the actual flow rate of fluid entering the hydraulic cylinder based on the second signal;
make a comparison of the estimated and determined actual flow rates of fluid entering the hydraulic cylinder; and
determine the correction flow rate based on the comparison,
wherein:
the correction flow rate used to estimate the actual flow rate of fluid is determined from a previously executed cycle of the system response model; and
the system response model includes:
a first portion configured to model a first delay from a time that a command is sent by the controller to the valve arrangement to meter the desired and correction flow rates of fluid into the hydraulic cylinder to a time that the pump begins to respond to varying system pressures caused by metering of the valve arrangement;
a second portion configured to model a delay from the time that the pump begins to respond to varying system pressures caused by metering of the valve arrangement to a time when movement of the hydraulic cylinder is affected by the pump responding; and
a third portion configured to model behavior of the valve arrangement during movement of the hydraulic cylinder.

* * * * *